United States Patent [19]

Jensen

[11] Patent Number: 4,541,149
[45] Date of Patent: Sep. 17, 1985

[54] DEVICE FOR SELECTIVELY LOCKING AND RELEASING A ROPE MEMBER EXTENDING THERETHROUGH

[75] Inventor: Jens C. Jensen, Kalundborg, Denmark

[73] Assignee: Sophus Berendsen Marine A/S, Copenhagen, Denmark

[21] Appl. No.: 579,510

[22] Filed: Feb. 13, 1984

[30] Foreign Application Priority Data

Feb. 11, 1983 [DK] Denmark ............... 621/83

[51] Int. Cl.⁴ .................................... F16G 11/00
[52] U.S. Cl. ...................... 24/134 R; 24/132 R
[58] Field of Search ......... 24/132 R, 132 WL, 134 R, 24/134 KB, 134 L, 499, 500, 502, 510, 513, 508

[56] References Cited

U.S. PATENT DOCUMENTS 1,410,162  3/1922  Cadwell .............. 24/134 R
1,809,566  6/1931  Ott .
2,322,651  6/1943  MacChesney ......... 24/134 R
2,942,315  6/1960  Johnson .

FOREIGN PATENT DOCUMENTS 449 of 1894 United Kingdom ............. 24/132 R

Primary Examiner—William E. Lyddane
Assistant Examiner—L. K. Cranmer
Attorney, Agent, or Firm—Dennison, Meserole, Pollack & Scheiner

[57] ABSTRACT

A locking device for selectively locking and releasing a rope or a similar elongated, flexible element comprises a channel-shaped frame and a clamping member which is provided with a handle and is mounted swingably within the frame. The clamping member cooperates with a rope abutment surface defined by the bottom wall so as to clamp the rope, when the clamping member is swung in one direction by means of the handle, and so as to release the rope when the clamping member is swung in the opposite direction. In order to render it possible to arrange the handle in a convenient, protected position within the channel-shaped frame in the rope releasing as well as in the rope locking or clamping position of the clamping member, the clamping member and the handle are separate parts, each of which are independently swingable about a common axis, and the clamping member and the handle may be releasably interconnected by means of releasable coupling means, which may comprise a locking pawl.

10 Claims, 10 Drawing Figures

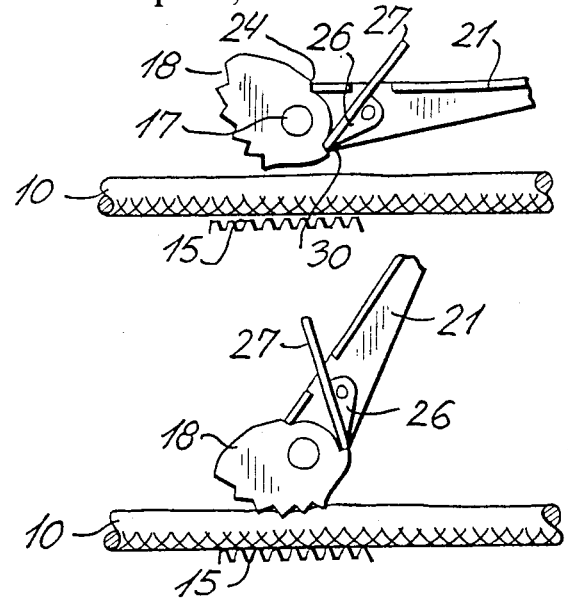
Fig. 2a
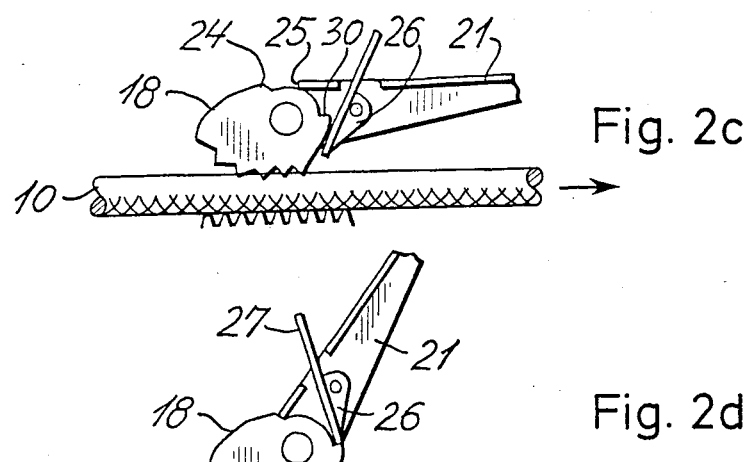
Fig. 2b
Fig. 2c
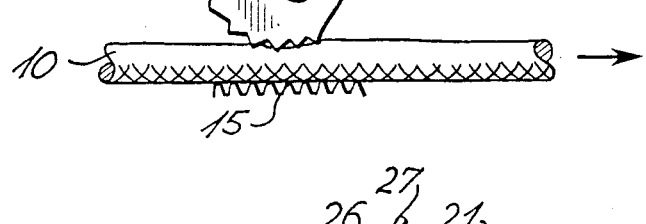
Fig. 2d
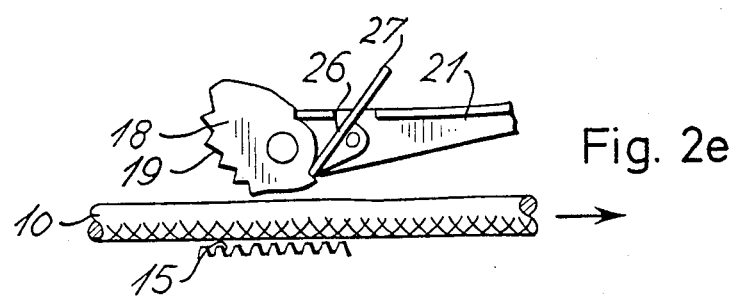
Fig. 2e

DEVICE FOR SELECTIVELY LOCKING AND RELEASING A ROPE MEMBER EXTENDING THERETHROUGH

BACKGROUND OF THE INVENTION

1. Field of the Invention

The present invention relates to a device for selectively locking and releasing a rope member extending therethrough. In the present specification the term "rope member" or "rope" should be interpreted in a broad sense so as to comprise any elongate, flexible, rope-like member, such as threads, wires, cords, lines, etc.

2. Description of the Prior Art

Locking devices of the above type may, for example, be used in sailing ships and at other locations where there is a need for quick locking and releasing of a tensioned rope or wire. As an example, the locking device of the above type may be used in connection with winches, tackles, or other pulling or falling mechanisms which may, for example, be used for hauling sails.

In a known locking device of the above type, a tensioned rope member may be passed through a passage defined between a first rope engaging surface formed on a frame member of the device, and an oppositely arranged, second rope engaging surface formed on a rope clamping eccentric which may moved manually between a rope locking and a rope releasing surface by means of a handle formed thereon. The frame member of the known locking device has a U-shaped cross-section and receives the swingably mounted clamping eccentric therein. When the eccentric is in its rope releasing position, the handle extending from the eccentric may also be received in the U-shaped frame member so that it is positioned substantially within the contour of the frame member. However, in the rope clamping position of the eccentric, the handle extends from the contour of the frame member so that the operator may grip the handle and forcibly move the eccentric into its rope clamping and locking position. In this rope clamping position, the angular position of the handle may vary depending on the thickness of the rope being clamped and on the manual force applied to the handle. Because the handle extends from the contour of the frame member in the rope clamping position of the eccentric, there is a substantial risk that the handle is accidentally moved to the rope releasing position, for example when the locking device is mounted on the deck of a sailing ship, or at other positions, where persons are moving around.

Danish Patent Application No. 4353/79 discloses a locking device of a similar type, wherein the clamping eccentric and the operating handle therefor are independently swingable elements, and the operating handle is used only for moving the swingable clamping eccentric into engagement with the rope. When a pulling force is applied to the rope the frictional forces between the rope and the rope engagement surface of the eccentric tend to move the eccentric into a more close engagement with the rope. It has been found, however, that the known locking device of the latter type is not sufficiently efficient to reliably lock a rope transmitting heavy pulling forces, for example of the order of 500 kp or more.

SUMMARY OF THE INVENTION

The present invention provides a locking device of the above type which is able to efficiently lock ropes or rope members transmitting big pulling forces, and which permits the operating handle to be moved to a desired angular position despite the position of the clamping eccentric, and prevents accidental release of the rope member.

Thus, the present invention provides a device for selectively locking and releasing a rope member extending therethrough, said device comprising a frame defining a first rope engaging surface, a rope clamping member mounted in the frame so as to be swingable about a fixed axis and having a second rope engaging surface positioned opposite to and spaced from the first rope engaging surface, so as to define a rope receiving passage between said rope engaging surfaces, the clamping member being swingable in first and second directions so as to reduce and increase the spacing of the rope engaging surfaces, respectively, a handle mounted swingably about said axis, and releasable coupling means for releasably coupling the handle to the clamping member, whereby the clamping member may be manually swung in said first and second directions between rope locking and rope releasing positions, respectively, by means of the handle, while the handle may be moved independently of the clamping member when the coupling means are released.

When the clamping member has been connected to the handle by means of the coupling means, the locking device according to the invention may function in the same manner as the above first mentioned known device, which means that by means of the handle the clamping member may be manually forced into engagement with the rope member so as to obtain the necessary clamping force to lock the rope member, or by means of the handle the clamping member may be swung in the opposite direction to its rope releasing position. When the clamping member has been moved into forcible engagement with the rope member, and is to remain in this position for a certain period of time, the coupling means may be released, whereafter the handle may be swung independently of the clamping member to a position in which the handle is received in and protected by the frame so that the handle does not project outwardly from the frame, and so that the clamping member is not accidentally moved from its rope engaging position. When the rope member is to be released, the handle is moved back to a position in which it may be connected to the clamping member by means of the coupling means, and the clamping member may then be moved to its released position by means of the handle.

The releasable coupling means may be of any suitable structure allowing quick and simple coupling and releasing operations and allowing transfer of sufficiently big forces. In a preferred embodiment the handle defines a first radially extending surface part, and the clamping member defines a second, peripherally oppositely directed radial surface part so that the first surface part may be moved into force transmitting engagement with the second surface part when the handle is swung in said first direction.

While these oppositely directed radially extending surface parts are able to transmit very big forces from the handle to the clamping member when the handle is moved towards the rope clamping or locking position, the coupling means must comprise additional means which are able to transmit the forces necessary for swinging the clamping member from its rope clamping or locking position to a rope releasing position. Such additional coupling means may be of any suitable type and may, for example, in a very simple embodiment be constituted by a removable coupling pin which may be received in aligned bores in the handle and the clamping member. In a preferred embodiment these additional coupling means are in the form of a pawl-like member movably mounted on the handle, and a radially extending third surface part defined on the clamping member and directed peripherally oppositely to the second surface part and positioned such that the pawl-like member may be moved into locking engagement therewith. A swinging movement of the handle towards the rope releasing position of the clamping member may then be transmitted to the clamping member via the pawl-like member and said third surface part on the clamping member.

In principle, said third surface part may be positioned on the clamping member so as to cause a certain lost motion between the handle and the clamping member when they are coupled together. However, said third surface part is preferably formed in such a position on the clamping member that the pawl-like member may be moved into engagement with the third surface part only when said first and second surface parts are in mutual force transmitting engagement. The handle and the clamping member may then be coupled together so as to avoid any substantial lost motion between the parts.

The locking device according to the invention may further comprise spring means acting between the handle and the clamping member for biasing the clamping member towards its rope locking position. Such spring means tend to retain the clamping member in its rope locking or clamping position to which it has been moved by means of the handle, also when the coupling means have been released, and the spring means may also automatically swing the handle into a protected position within the frame, when the coupling means have been released.

BRIEF DESCRIPTION OF THE DRAWINGS

The invention will now be further described with reference to the drawings, wherein.

DESCRIPTION OF THE PREFERRED EMBODIMENT

Figure 1:
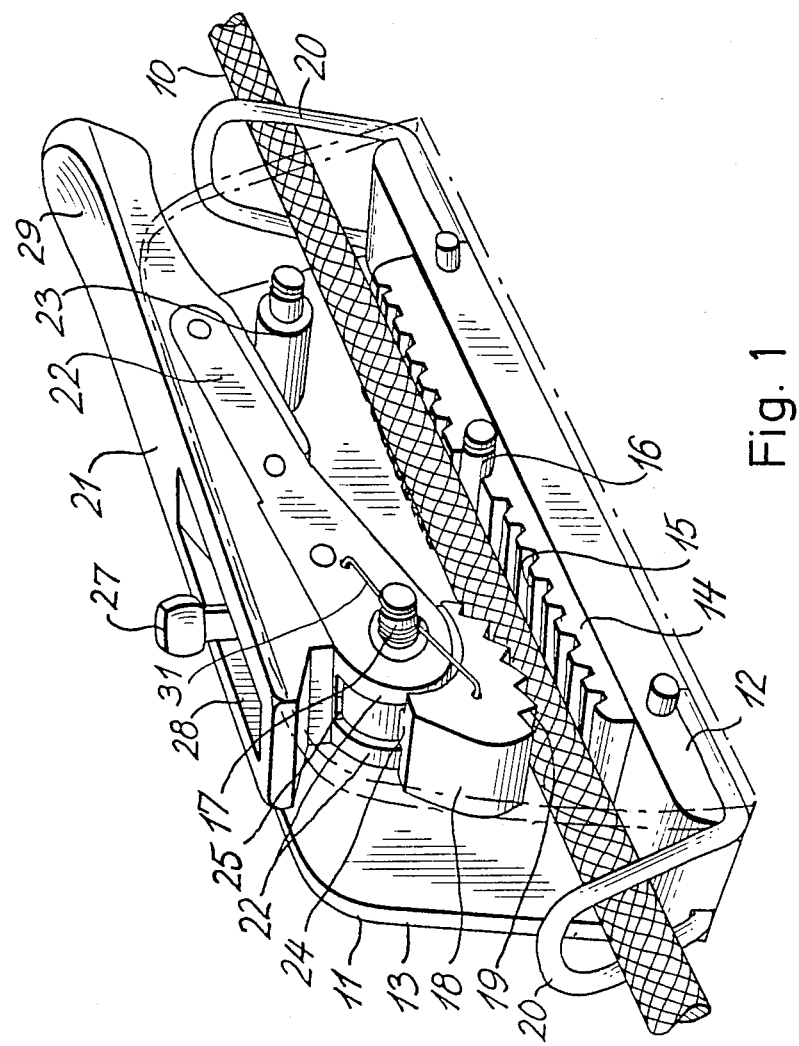
FIG. 1 is a perspective view of an embodiment of the locking device according to the invention, wherein a wall part has been shown in phantom, FIGS. 2a-2e diagrammatically illustrate the function of the locking device when locking a rope, in which heavy tensions occur, and FIGS. 3a-3d diagrammatically illustrate the function of the locking device when locking a rope, in which only relatively small tensions occur.

The locking device shown in the drawings is adapted to selectively lock or clamp a rope, a line, a cord, a wire, or a similar elongated flexible, tensionable element 10. The locking device comprises a frame 11 having a bottom wall 12 and a pair of mutually spaced, parallel side walls 13 extending upwards from the bottom wall 12. Thus, the frame 11 is substantially channel-shaped and has a substantially U-shaped cross-section. A rope engaging plate 14 is releasably mounted on the inner surface of the bottom wall 12, and the upper, exposed surface of the plate 14 defines a serrated or otherwise roughened rope abutment surface 15. As shown in FIG. 1, the plate 14 may be retained in position on the bottom wall 12 by means of a removable screw or pin 16 extending between and transversely to the side walls 13 and being received in a transverse groove formed in the upper surface of the plate 14.

A rope clamping member 18 is mounted swingably about a shaft or pin 17 positioned above the rope engaging surface 15 and extending between and transversely to the side walls 13. The rope clamping member 18 has a serrated rope engaging surface 19 formed thereon. The rope engaging surface 19 is positioned opposite to and spaced from the rope abutment surface 15 and may be moved into engagement with the rope 10 extending through loop-shaped guide members 20 positioned at opposite ends of the bottom wall 12, and through the space defined between the rope abutment surface 15 and the rope engaging surface 19, as described in closer detail below.

An operating handle 21 has a pair of mutually spaced legs 22, which are rotatably mounted on the shaft or pin 17 and embrace the adjacent part of the rope clamping member 18. In the condition shown in FIG. 1 the clamping member 18 and the handle 21 may be independently swung about the common shaft 17. However, the locking device according to the invention preferably comprises spring means 31, illustrated in FIG. 1 and which tends to swing the clamping member 18 downwards against its rope engaging position, and to swing the operating handle 21 towards the position shown in FIG. 1, in which the bottom side of the handle is in engagement with a supporting bracing 23 extending transversely between the side walls 13.

A substantially radially extending abutment surface 24 is formed on the clamping member 18, and a corresponding abutment surface 25 formed on the handle 21 and positioned between the legs 22 may be moved into force transmitting engagement with the abutment surface 24 by swinging the handle 21 counter clockwise as viewed in FIG. 1.

As best shown in FIGS. 2 and 3, a locking pawl 26 is swingably mounted in the space defined between the legs 22 of the handle 21. The pawl 26 has a control arm 27 extending through a slot 28 formed in a part 29 of the handle 21 positioned between the legs 22. When the operating handle 21 has been moved to such an angular position that the force transmitting abutment surfaces 24 and 25 have been brought into mutual engagement, the locking pawl 26 may be swung into engagement with a substantially radially extending pawl engaging surface 30 formed on the clamping member 18 as best shown in FIGS. 2 and 3. When the pawl 26 has been brought into engagement with the surface 30, the handle 21 and the clamping member 18 are interconnected and function as a single, rigid unit. The control arm 27 of the locking pawl 26 may be actuated so as to move the pawl out of engagement with the surface 30, and thereafter the handle may again be swung independently of the clamping member 18.

As shown in FIG. 1, the rope engaging plate 14 is divided into two halves of different thicknesses. If the locking device shown in FIG. 1 is to be used in connection with a thinner rope or cord 10, the plate 14 may be turned so that the thicker half of the plate is positioned immediately below the clamping member 18, whereby the space defined between the rope abutment surface 15 and the rope engaging surface 19 of the clamping member 18 is reduced.

The function of the locking device shown in FIG. 1 will now be described in closer detail with reference to FIGS. 2 and 3, which diagrammatically illustrate the clamping member 18 and the operating handle 21 in various positions of use.

In FIG. 2a the handle 21 is connected to the clamping member 18, as the force transmitting abutment surfaces 24 and 25 are in mutual engagement and the locking pawl 26 is in engagement with the pawl engaging surface 30. The handle 21 has been swung clockwise into a substantially horizontal position in which the upper surface of the handle substantially flushes with the upper edges of the side walls 13 as shown in FIG. 1. The rope 10 may now be moved in any direction longitudinal to the frame. In FIG. 2b the handle 21, which is still connected to the clamping member 18, has been swung upwards so as to move the rope engaging surface 19 of the clamping member into forcible engagement with the rope 10, which is subjected to a tensile force acting in the direction indicated by an arrow. When the clamping member 18 has been pressed into sufficiently forcible engagement with the rope 10 to retain and lock the same against movement, the pawl 26 may be released whereafter the handle 21 may be swung back to its horizontal position, while the clamping member 18 remains in its rope engaging position as shown in FIG. 2c. When the rope 10 is to be released, the handle 21 is again swung upwards till the abutment surfaces 24 and 25 come into mutual engagement, and thereafter the locking pawl 26 is again moved into engagement with the pawl engaging surface 30 as shown in FIG. 2d. When the handle 21 is thereafter swung back to its horizontal position, the clamping member 18 is swung to its rope releasing position, as shown in FIG. 2e.

Figure 3A:
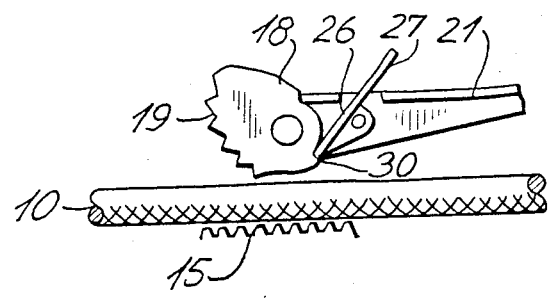
Figure 3B:
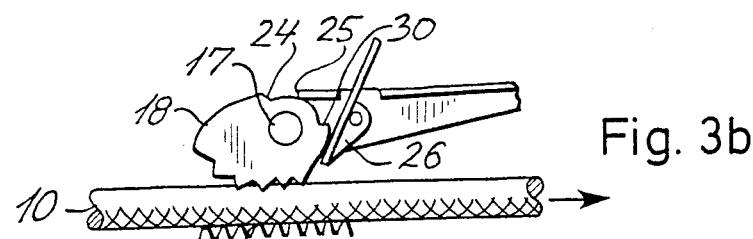
Figure 3C:
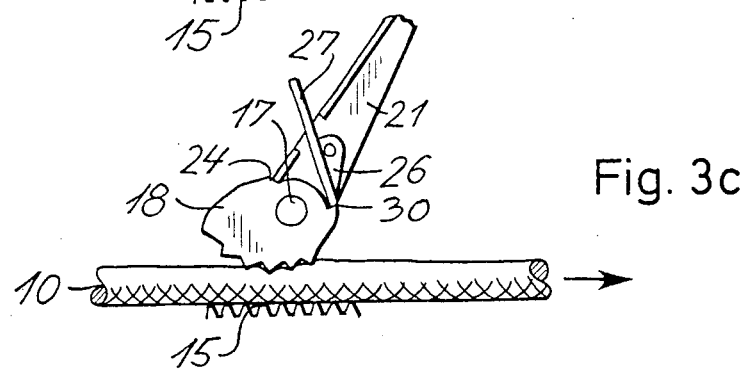
Figure 3D:
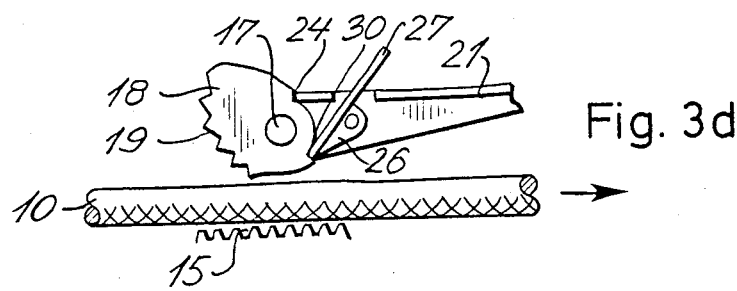

FIG. 3a shows the same starting position as in FIG. 2a, wherein the handle 21 and the clamping member 18 are interconnected, and the clamping member is in its rope releasing position. It is assumed that the tensile force applied to the rope 10 is relatively small, and the rope 10 may then be locked by releasing the locking pawl 26, while the handle 21 remains in its substantially horizontal position as indicated in FIG. 3b. The spring means 31 acting between the handle 21 and the clamping member 18 will bias the clamping member 18 in a counter clockwise direction and into engagement with the rope 10. The tensile force applied to the rope 10 tends to swing the clamping member 18 into a still stronger engagement with the rope, whereby the rope is clamped and locking in position. When it is desired to release the rope, the handle 21 may be swung to a position in which the pawl 26 may be brought into engagement with the pawl engaging surface 30 as shown in FIG. 3c, and the handle 21 may then be swung back to its substantially horizontal position, whereby the clamping member 18 is simultaneously swung back to its rope releasing position as shown in FIG. 3d.

It should be understood that various modifications and changes of the embodiment described above and shown in the drawings could be made within the scope of the present invention. As an example, the locking pawl 26 and the force transmitting abutment surfaces 24 and 25 may be replaced by other types of releasable coupling means such as a simple coupling pin which may be received in bores in the handle 21 and the clamping member 18, respectively, when the bores are aligned.

I claim:

1. A device for selectively locking and releasing a rope member extending therethrough, said device comprising
   a frame, a first rope engaging surface on said frame,
   a rope clamping member mounted in the frame so as to be swingable about a fixed axis and having a second rope engaging surface positioned opposite to and spaced from the first rope engaging surface so as to define a rope receiving passage between said rope engaging surfaces, the clamping member being swingable in first and second directions so as to reduce and increase the spacing of the rope engaging surfaces, respectively,
   a handle mounted swingably about said axis,
   releasable coupling means for releasably coupling the handle to the clamping member, whereby the clamping member may be manually swung in said first and second directions between rope locking and rope releasing positions, respectively, by means of the handle, while the handle may be moved independently of the clamping member, when the coupling means is released.

2. A device according to claim 1, wherein the handle defines a first abutment surface, and the clamping member defines a second, peripherally oppositely directed, abutment surface part so that the first abutment surface may be moved into force transmitting engagement with the second abutment surface, when the handle is swung in said first direction.

3. A device according to claim 2, wherein the handle comprises a pair of spaced legs embracing the clamping member.

4. A device according to claim 6, wherein said first abutment surface is positioned between said spaced legs of the handle.

5. A device according to claim 2, wherein the releasable coupling means comprises a pawl-like member movably mounted on the handle, and a third surface defined on the clamping member and directed peripherally oppositely to the second surface and positioned such that the pawl-like member may be moved into locking engagement therewith.

6. A device according to claim 5, wherein said third surface is formed in such a position on the clamping member that the pawl-like member may be moved into engagement with the third surface only when said first and second surfaces are in mutual force transmitting engagement.

7. A device according to claim 6, wherein the handle comprises a pair of spaced legs embracing the clamping member, the pawl-like member being mounted swingably about a pin, which extends transversely to and between the legs of the handle, the pawl-like member comprising a control arm having a free end thereof positioned at an easily accessible location outside a space defined between said legs.

8. A device according to claim 7, wherein said free end of the control arm extends through an opening formed in the handle.

9. A device according to claim 1, further comprising spring means acting between the handle and the clamping member for biasing the clamping member towards its rope locking position.

10. A device according to claim 1, including an elongated, releasably mounted rope engaging plate member on said frame having longitudinally consecutive portions of different thicknesses and defining said first rope engaging surface, the plate member being mountable so that any of said consecutive portions may be placed opposite to the second rope engaging surface and define the first rope engaging surface.

* * * * *